United States Patent Office 2,942,796
Patented June 28, 1960

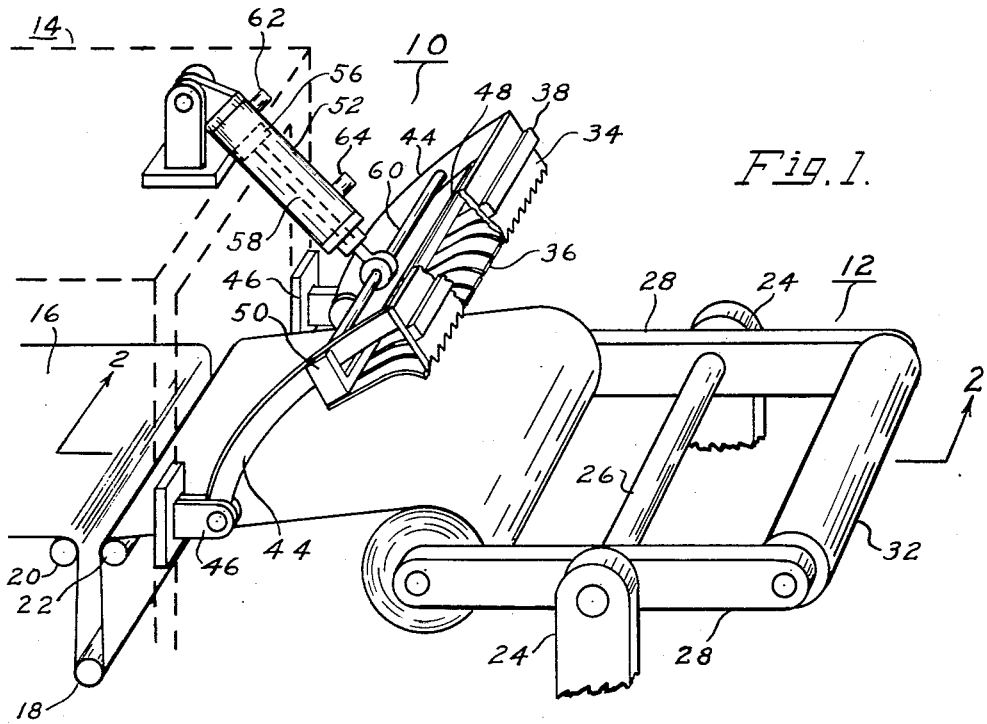

2,942,796

APPARATUS FOR WINDING THERMOPLASTIC FILM INTO ROLLS

Frank A. Gurney, Wilbraham, Mass., and Harry M. Keating, Texas City, Tex., assignors to Monsanto Chemical Company, St. Louis, Mo., a corporation of Delaware Filed Aug. 26, 1954, Ser. No. 452,339

4 Claims. (Cl. 242—56)

This invention relates to apparatus for use in the winding of thermoplastic film. More particularly, this invention relates to apparatus for positively sealing an unwound length of film to a core about which it is to be wound.

Thermoplastic film is conventionally prepared by continuously casting, calendering or extruding a thermoplastic material such as plasticized polyvinyl chloride. The film is continuously delivered from the forming mechanism at a comparatively rapid rate and is sequentially wound about adhesively-surfaced cylindrical cores into rolls of the desired length. When substantially the desired length of film has been wound about a core it becomes necessary to sever the wound portion of the film from the unwound portion and to secure such unwound portion to a fresh core. In carrying out this operation in accordance with usual methods, the unwound portion of the film is normally sealed to the fresh core rearwardly of the cut end thereof (e.g. 1–4 inches from the cut) so that a terminal end segment is formed which is not positively sealed to the core. This terminal end segment generally forms a reverse lap during the first revolution of the core. As a practical matter, such reverse laps are usually severely wrinkled by rotation of the core and the wrinkled lap impresses indentations into several succeeding laps of film. Portions of the film that become wrinkled or severely indented during winding operations must generally be discarded. Frequently the first fifty feet or more of a roll of film may be damaged in this fashion. Various expedients have been proposed in an effort to satisfactorily seal the end of the unwound portion of the film to the fresh core without the formation of reverse laps. However, past attempts have generally been unsatisfactory in one respect or another and have left much to be desired.

Accordingly, an object of the present invention is the provision of apparatus to be used in conjunction with a film winding device for securing the end portion of a length of film to an adhesively-surfaced cylindrical core about which the film is to be wound.

Another object is the provision of apparatus to be used in conjunction with a film winding device for severing the unwound portion of a length of film from the wound portion thereof and for sealing the end of the unwound portion to a fresh core.

A further object is the provision of a process for winding thermoplastic film.

The manner in which these and other objects are attained will be readily apparent from the following specification describing a preferred embodiment of the present invention, as illustrated in the accompanying drawings. In the drawings:

Fig. 1 is a perspective view of a preferred embodiment of the present invention with parts broken away;

Fig. 2 is a side elevational view taken generally along the lines 2—2 of Fig. 1 with the cores reversed, showing the apparatus of Fig. 1 in section, and additionally, showing the cooperative relationship between such apparatus and an adhesively-surfaced cylindrical core to which thermoplastic film is to be sealed;

Fig. 3 is a perspective view of one of the fingers forming a part of the present invention; and Fig. 4 is a fragmentary side elevational view, to an enlarged scale, of a portion of the apparatus shown in Fig. 2.

Turning now to the drawings, and especially to Figs. 1 and 2, there is shown a sealing device 10 constructed in accordance with the present invention for use in conjunction with a suitable film winding device 12. The film winding device 12 is preferably positioned adjacent the discharge end of a suitable film-forming device 14, shown schematically in dotted lines. Suitable means are preferably provided for controlling the rate at which thermoplastic film 16 is wound into rolls on the film winding device 12, such means comprising, for example, a dancer roll 18 spaced intermediate a pair of idler rolls 20 and 22. Delivery of the film 16 from the film-forming device 14 tends to cause the dancer roll 18 to move away from the idler rolls 20 and 22 under the force of gravity, this tendency being counteracted by positive withdrawal of the film 16 from the film-forming device 14 by the winding device 12.

The winding device 12 may be of any suitable construction and may comprise, for example, a pair of spaced parallel uprights 24 between which is journaled a support shaft 26. A pair of spaced parallel side arms 28 are fixed to the shaft 26 for rotation thereabout in the direction of travel of the film 16. A pair of adhesively-surfaced cylindrical cores 30 and 32 are removably rotatably mounted in tandem alignment at the ends of the side arms 28. Each of the cores 30 and 32 should be independently driven by suitable means (not shown) such as a variable speed electric motor, the motor being provided with a control element (not shown) connected with the dancer roll 18 for reducing the speed of the motor in response to movement of the dancer roll 18 towards the idler rolls 20 and 22 and for increasing the speed of the motor on movement of the dancer roll 18 away from the idler rolls 20 and 22. With this arrangement the core about which the film 16 is being wound is rotated at a progressively decreased speed as the winding action progresses in order to compensate for the increased amount of the film 16 that is wound with each rotation of the core. As a result, the film 16 is normally wound into rolls at a rate which is substantially equal to the rate at which it is delivered from the film-forming device 14, the dancer roll 18 progressively moving towards the idler rolls 20 and 22 as the roll of film is being formed.

The sealing device 10 of the present invention comprises cutting means such as the knife 34 cooperatively spaced with respect to a plurality of aligned fingers 36. The knife 34 should have a length at least equal to the width of the thermoplastic film 16 and is preferably provided with a serrated cutting edge. There may be optionally provided a suitable means for heating the cutting edge of the knife 34, such means illustratively comprising an electrical resistance element 38 mounted on the knife 34 and connected with a suitable source of electrical energy (not shown).

With reference to Fig. 3, it is seen that each of the fingers 36 comprises a rear portion 40 and an arcuate front portion 42. As shown more clearly in Fig. 4, the arcuate front portions 42 of the fingers 36 should have radii substantially equal to the radius of the core 32. The arcuate portions 42 should define equal arcs of about 30–70 degrees and, preferably, arcs of about 65 degrees.

The knife 34 and the fingers 36 should be mounted on a support of suitable construction in normally spaced relationship to the thermoplastic film 16 for controlled periodic movement into the path of travel of the same.

A support of suitable construction may comprise, for example, spaced parallel arms 44 pivotally mounted, at the inner ends thereof, to a pair of aligned brackets 46. The brackets 46, in turn, are mounted on a suitable base such as the front of the film-forming device 14. In accordance with the illustrated form of the invention, the knife 34 is fixed to the outer ends of the arms 44 in cooperative relationship with respect to a core, such as the core 32, to which the thermoplastic film is to be sealed so that the knife 34 will intersect the path of travel of the film 16 in a plane normal to the length of the film 16 and cordal to the core 32.

The fingers 36 should be mounted to the arms 44 across the width of the film 16 in a manner such that the arcuate end portions 42 thereof terminate in proximity to and slightly above the cutting edge of the knife 34. Suitable structure for this purpose may comprise a generally U shaped bracket 48 having upstanding legs 50, each of which is fixed to a corresponding arm 44 intermediate the ends thereof. In accordance with this construction, the rear portions 40 of the fingers 36 are fixed to the web of the bracket 48 in alignment with the longitudinal axis of the core 32. When the fingers 34 are positioned in this fashion, the arcuate front portions 42 will move into a position concentric with the core 32 when the film 16 is severed (Fig. 4).

Suitable means should be provided for normally spacing the knife 34 and the fingers 36 from the thermoplastic film 16 for periodic movement into the path of travel of the same. Such means may comprise, illustratively, a pressure cylinder 52 centrally pivotally mounted above the film 16 on a suitable base such as the film-forming device 14 by means of a bracket 54. The pressure cylinder 52 is provided with a reciprocatable piston 56 carried by a piston rod 58, such piston rod 58 being pivoted at the outer end thereof to a tie-rod 60 fixed to the arms 44. Conduits 62 and 64 communicating with the interior of the cylinder 52 at opposite ends thereof are connected with a suitable source of fluid pressure (not shown) to be used to periodically reciprocate the piston 56.

Operation

During operations, thermoplastic film 16 is continuously formed by the film-forming device 14. The film 16 is passed about a first idler roll 20, a dancer roll 18 and a second idler roll 22 in the form of a festoon and is then passed to the winding device 12 where it is sequentially wound into rolls about adhesively-surfaced cylindrical cores 30 and 32. With reference to Fig. 1, it is seen that the film 16 is initially wound about the core 30 positioned nearest the film-forming device 14. While the film 16 is being wound about the core 30, the knife 34 and the fingers 36 should be spaced from the path of travel of the film 12. The unwound core 32 remains idle.

When winding action about the core 30 is initiated, the dancer roll 18 is properly spaced from the idler rolls 20 and 22 so that the rate at which the core 30 is rotated is substantially equal to the rate at which the film 16 is delivered to the film winding device 12 by the film forming device 14. As successive laps of the film 16 are formed about the core 30, the roll of the film 16 increases in diameter so that progressively longer lengths of the film 16 are wound with each rotation of the core 16. The film 16 thus tends to be wound at a rate which is greater than the rate at which it is delivered from the film-forming device 14. As a result, the film winding device 12 draws on the length of the film 16 festooned about the idler rolls 20 and 22 and the dancer roll 18 thus causing the dancer roll 18 to move towards the idler rolls 20 and 22. Through operation of the control element (not shown) interconnecting the dancer roll 18 and the driving means for the core 30 (not shown), movement of the dancer roll 18 towards the idler rolls 20 and 22 causes the rate of rotation of the core 30 to be decreased so as to bring the film winding rate into balance with the film forming rate. Thus, as the roll of the film 16 about the core 30 increases in size the dancer roll 18 will slowly move towards the idler rolls 20 and 22 and will be in relative close proximity thereto by the time a complete roll of the film 16 has been formed about the core 30.

When the terminal portion of the thermoplastic film 16 has been formed into a substantially complete roll of film about the core 30 in this fashion the relative positions of the cores 30 and 32 are reversed by rotating the side arms 28 about the shaft 26 in the direction of travel of the film 16. After reversal of the cores 30 and 32 and while film is still being delivered to the film winding device 12 and wound about the core 30, a substantially simultaneous sequence of operations is initiated as a result of which the unwound portion of the film 16 is severed from the wound portion thereof and sealed to the adhesive surface of the core 32.

In accordance with this process, fluid pressure is admitted to the upper part of the cylinder 52 through the conduit 62 to thereby drive the piston 56 towards the film winding device 12. Movement of the cylinder 52 actuates a suitable control member (not shown) which energizes the driving mechanism (not shown) for the core 32 and idles the core 30. However, there is a short lag between the time when the driving mechanism is energized and the time when actual rotation of the core 32 commences due to the inertia that must be overcome. During this short lag there is no positive withdrawal of the film 16 from the film-forming device 14 and, as a result, motion of the film 16 relative to the core 32 is momentarily interrupted. The dancer roll 18 moves away from the idler rolls 20 and 22 under the force of gravity to take up the film 16 being freshly formed on the film-forming device 14 and thus acts to increase the rate at which the core 32 is rotated. During the short lag when motion of the film 16 relative to the core 32 has been thus interrupted, the knife 34 and the fingers 36 move into the path of travel of the thermoplastic film 16. As the arcuate end portions 42 of the fingers 36 move into concentricity with the core 32 they engage the portion of the thermoplastic film 16 therebetween and forces this segment into concentric engagement with the core 32. At the same time, the film 16 is severed by the knife 34 adjacent the ends of the fingers 36. As a result, the unwound portion of the thermoplastic film 16 is severed from the wound portion thereof and the end of the unwound portion as shown in Fig. 4, is positively sealed to the surface of the core 32 without the formation of an unsealed end segment.

Substantially simultaneously on sealing engagement of the unwound portion of the film 16 with the surface of the core 32, the knife 34 and the fingers 36 are moved from the path of travel of the film 16 by applying fluid under pressure through the conduit 64 and relieving pressure through the conduit 62 to thereby raise the piston rod 58 and the sealing device 10 carried thereby. Rotation of the core 32 will have commenced by the time the arcuate end portions 42 of the fingers 36 have moved from concentricity with the core 32 and the rate at which the film 16 is wound thereabout will thereafter be regulated in the customary manner by movement of the dancer roll 18 relative to the idler rolls 20 and 22. The previously wound core 30 is removed from the winding device 12 while the film 16 is being wound about the core 32 and a fresh core (not shown) is substituted therefor. When a substantially complete roll of the film 16 has been formed about the core 32, the above-described procedure is repeated.

What is claimed is:

1. In a device for sealing a film to an adhesively-surfaced cylindrical core positioned adjacent one side of the film, the improvement which comprises an adhesively surfaced cylindrical core positioned beneath a film, a plurality of arcuately-ended fingers aligned with said core on the other side of and across the width of said film for movement into concentricity with said core to thereby engage a portion of said film and positively bring the thus-engaged portion of the film into sealing engagement with the adhesive surface of said core, and means for cutting said film adjacent the arcuate ends of said fingers on movement of said fingers into engagement with said film, said cutting means being fixedly secured to a movable support member and said arcuately-ended fingers being fixedly secured to said support member at a point substantially spaced toward the film source from said cutting means and parallel thereto.

2. In a device for sealing a film to an adhesively-surfaced cylindrical core positioned beneath the film, the improvement which comprises an adhesively surfaced cylindrical core positioned beneath a film, a plurality of aligned fingers above and extending across the width of said film, said fingers being in alignment with said core and terminating in arcuate end portions having radii substantially equal to the radius of said core, means connected with said fingers for periodically moving the same into concentricity with said core to thereby cause said fingers to engage a portion of said film and positively bring the thus-engaged portion into sealing engagement with the adhesive surface of said core, and means for cutting said film adjacent the arcuate ends of said fingers on movement of said fingers into engagement with said film, said cutting means being fixedly secured to a movable support member and said arcuately-ended fingers being fixedly secured to said support member at a point substantially spaced toward the film source from said cutting means and parallel thereto.

3. Apparatus as in claim 2 wherein the arcuate ends of the fingers define equal arcs of about 30–70 degrees.

4. Apparatus as in claim 2 wherein the arcuate ends of the fingers define equal arcs of about 65 degrees.

References Cited in the file of this patent

UNITED STATES PATENTS

| | | |
|---|---|---|
| 1,154,301 | Fogarty | Sept. 21, 1915 |
| 1,473,089 | Faust | Nov. 6, 1923 |
| 1,976,641 | Vernon et al. | Oct. 9, 1931 |
| 2,361,264 | Christman | Oct. 24, 1944 |
| 2,518,069 | Roper | Aug. 8, 1950 |
| 2,586,833 | Kohler et al. | Feb. 26, 1952 |
| 2,620,141 | Langbo | Dec. 2, 1952 |
| 2,650,038 | Kievit | Aug. 25, 1953 |
| 2,681,771 | Haskell | June 22, 1954 |
| 2,686,015 | Stevens | Aug. 10, 1954 |